US012014839B2

(12) United States Patent
Tang et al.

(10) Patent No.: US 12,014,839 B2
(45) Date of Patent: Jun. 18, 2024

(54) X-RAY TRANSFOCATOR AND FOCUS VARIATION METHOD

(71) Applicant: INSTITUTE OF HIGH ENERGY PHYSICS, CHINESE ACADEMY OF SCIENCES, Beijing (CN)

(72) Inventors: Shanzhi Tang, Beijing (CN); Zhongrui Ren, Beijing (CN); Weiwei Zhang, Beijing (CN); Weifan Sheng, Beijing (CN); Ming Li, Beijing (CN)

(73) Assignee: INSTITUTE OF HIGH ENERGY PHYSICS, CHINESE ACADEMY OF SCIENCES, Beijing (CN)

( * ) Notice: Subject to any disclaimer, the term of this patent is extended or adjusted under 35 U.S.C. 154(b) by 56 days.

(21) Appl. No.: 17/794,769

(22) PCT Filed: Jul. 12, 2021

(86) PCT No.: PCT/CN2021/105748
§ 371 (c)(1),
(2) Date: Jul. 22, 2022

(87) PCT Pub. No.: WO2023/272777
PCT Pub. Date: Jan. 5, 2023

(65) Prior Publication Data

US 2023/0187097 A1 Jun. 15, 2023

(30) Foreign Application Priority Data

Jul. 2, 2021 (CN) ......................... 202110749281.0

(51) Int. Cl.
*G21K 1/06* (2006.01)

(52) U.S. Cl.
CPC .................................... *G21K 1/065* (2013.01)

(58) Field of Classification Search
CPC ................................ G21K 1/06; G21K 1/065
See application file for complete search history.

(56) References Cited

U.S. PATENT DOCUMENTS 8,611,502 B1 12/2013 Adams et al.

FOREIGN PATENT DOCUMENTS

| | | | |
|---|---|---|---|
| CN | 1472749 | A | 2/2004 |
| CN | 110514682 | A | 11/2019 |
| EP | 3540743 | A1 | 9/2019 |

(Continued)

OTHER PUBLICATIONS

Chinese Search Report from Application No. 202110749281.0 dated Jul. 2, 2021.

(Continued)

*Primary Examiner* — Jurie Yun
(74) *Attorney, Agent, or Firm* — Dilworth & Barrese, LLP.; Michael J. Musella, Esq.

(57) ABSTRACT

The invention discloses an X-ray zoom lens system (Transfocator) and a focus variation method. The system includes a main frame, many switched arms arranged on one side of the main frame, and a driving component set at the top of the main frame, and a positioning groove set at the bottom of the main frame; For them, each switched arm is composed of successively connected a push rod, a push-push ratchet mechanism, a preload spring and a guide stick, two-dimensional flexible axis, and a CRLs holder from top to bottom; CRLs are stacked and arranged in the mentioned above CRLs holder.

7 Claims, 7 Drawing Sheets

(56) References Cited

FOREIGN PATENT DOCUMENTS

| | | | |
|---|---|---|---|
| KR | 101519475 | B1 | 5/2015 |
| WO | 0068954 | A1 | 11/2000 |

OTHER PUBLICATIONS

International Search Report and Written Opinion from PCT/CN2021/105748 mailed Mar. 23, 2022.
P. Snigirev, V. Kohn, I. Snigireva, B. Lengeler; A compound refractive lens for focusing high-energy X-rays); Nature, 384(7), 1996.
P. Marion; Overview of engineering projects for the ESRF Upgrade beamlines; MEDSI2012, SSRF, Oral report.
Zozulya, A.V.; "Microfocusing transfocator for ID and 2D compound refractive lenses"; Optics Express; Aug. 2, 2012; 18967-18976.
Narikovich, Anton; CRL-based ultra-compact transfocator for X-ray focusing and microscopy; Journalof Synchrotron Radiation; Dec. 31, 2019; 26: 1208-1212.
Zozulya, Alexey; "Beam conditioning CRL transfocator optics at the MID Instrument of the European XFEL"; Proceedings of SPIE; 09. 9; Sep. 9, 2019.

X-RAY TRANSFOCATOR AND FOCUS VARIATION METHOD

This application claims priority to International Application No. PCT/CN2021/105748 filed on Jul. 12, 2021, which claims priority to CN 202110749281.0 having a filing date of Jul. 2, 2021.

TECHNICAL FIELD

The invention belongs to the field of synchrotron radiation technology, and specifically relates to a new X-ray zoom lens system (Transfocator) and its focus variation method.

BACKGROUND OF THE INVENTION

Compound refractive lens (CRLs) is a modern X-ray optical element, which is mainly used for optical modulation such as high-energy X-ray focusing. Its principle and structure are shown in FIG. 1 (Refer to P. Smagirev, V. Kohn, I. Sngireva, and B. Lengeler, *A compound refractive lens for focusing high-energy X-rays. Nature,* 384(7), 1996). And transfocator is a modern optical instrument or device that can switch the different specifications and quantities stack of CRLs to the status of ON-axis or OFF-axis to form a variety of CRLs arrangement combination to realize focus variation function, which will have broad application prospects in advanced light sources such as the $4^{th}$ generation synchrotron radiation.

Nowadays, the structure and design scheme of a typical transfocator as shown in FIG. 2 (Refer to P. Marion, *Overview of engineering projects for the ESRF Upgrade beamlines, MEDSI*2012. *SSRF, Oral report*), which arrange many arms one by one along the optical axis (supposed the number of the arms as N). And each arm has an individually motor drive and guidance to be move up and down. In this way, the CRLs unit placed at the bottom of the arm can be switch on or off relative to the optical axis so that forms variety of CRLs arrangement combination for focus variation function also named zoom focusing.

For the typical transfocator, N motors and N flanges for motion feed through vacuum must be adopted when there are N arms. But, the size of each arm and the space distance of arms should not be too small due to the motor and flange size limitation. Obviously, the typical transfocator not only has cumbersome, uncompact and high cost, but also occupies a large space affecting work distance of the entire focusing device (distance from contour behind edge to the focusing point). Therefore, its performance is greatly limited, and it is difficult to meet the technical requirements of advanced beamline design and layout optimization.

SUMMARY OF THE INVENTION

To solve the problem of the existed techniques, the invention aims to provide a novel X-ray transfocator and its focus variation method. The invention presents an orthogonal motor drive scheme based on horizontal and vertical direction motors, that is only 2 pieces motors and orthogonal layout. It has merits of simple structure, compact size and low cost, not only has a larger work distance to be easily assembled, but also provides a technical basis for beamline design optimization to achieve high performance goals.

The technical solutions of the invention is as follows:

An X-ray transfocator system includes a main frame, switched arms on one side of the main frame arranged along the optical axis of the transfocator system, and a driving component set at the top of the main frame, and a positioning groove set at the bottom of the main frame, wherein.

the each switched arm has successively connected a push rod, a push-push ratchet mechanism, a preload spring and a guide stick, two-dimensional flexible axis, and a CRLs holder from top to bottom; the guide stick is a telescopic structure, which is located in the preload spring; CRLs are arranged in the CRLs holder; the push-push ratchet mechanism contains that an extension spring, a slider with ratchet guide slot, a guide baseplate, a C-shaped tie rod, in which the slider with ratchet guide slot and the guide baseplate form a linear guide motion pair by a linear groove and a guide structure; the upper end of the slider with ratchet guide slot is connected to the upper end of the guide plate by the extension spring; the lower end of the slider with ratchet guide slot is successively connected with the preload spring and guide stick, the two-dimensional flexible axis, and the CRLs holder; the upper end of the C-shaped tie rod is used to slide in the ratchet guide slot of the slider with ratchet guide slot, and its lower end is connected with the bottom end of the guide baseplate by an elastic clamping;

the positioning groove is located just below the switched arms, and faced up, whose axis is parallel to the optical axis;

the driving component comprises a linear positioning table and a motor on a linear positioning table. The linear positioning table is used to move the (vertical linear) motor above the arm to be switched. The motor is used to thrust the push rod of the switched arm, to control the slide of the upper end of the corresponding C-shaped tie rod in the ratchet guide slot of the slider with the ratchet guide slot, so that the slider with the ratchet guide slot is in a low or high state, to make the switched arm to be ON-axis or OFF-axis relative to the optical axis.

Further, the positioning groove is a V-groove whose the common line of the two inclined planes is parallel to the optical axis.

Further, the ratchet guide slot of the slider with ratchet guide slot is a Y-shaped ratchet slot whose the upper and bottom are correspond to the low state and high state respectively.

Further, when the slide with ratchet guide slot moves down by the push rod, the downward thrust is the sum of the tension of the extension spring and the pressure of the preload spring, so that the upper end of the C-shaped tie rod unidirectionally slides in the ratchet guide slot from bottom to top. When the slide with ratchet guide slot moves from high to low, the upper end of the C-shaped tie rod slides in the ratchet guide slot from the bottom to top and back hooks with the slider with ratchet guide slot, that is, the slider with ratchet guide slot realizes a switch from the high state to the low state.

Further, when the motor reaches the arm to be switched, if the corresponding CRLs are OFF-axis state, the pushing process includes three stages: In the first stage, the push shaft of the motor moves downward until it contacts the push rod of the arm to be switched; In the second stage, the motor continues to push down the push rod to make the arm to be switched a downward motion so that the CRLs reach the V-groove at the bottom, and to make the cylindrical contour of the CRLs is tangent to the two inner inclined planes of the V-groove; In the third stage, the motor still continues to push down, and the action of the push rod makes the slider with ratchet guide slot of the push-push ratchet mechanism in the arm to be switched further down to the limit position: The the motor executes the lifting until the push shaft and the push rod are disconnected.

An X-ray focus variation method based on an X-ray transfocator system, including the following steps, 1) a linear positioning table sends a (vertical linear) motor to the position of the target arm to be switched:
2) the push shaft of the motor pushes the push rod of the target switched arm downward, to make the slider with ratchet guide slot of the target switched arm moves down to the limit position and returns to the upward motion; if the CRLs of the target switched arm is previous OFF-axis state, the CRLs will be pushed down to the optical axis of the transfocator under the action of the push shaft of the motor, that is, the CRLs are switched into the state of ON-axis; Otherwise, if the CRLs is previous ON-axis state, the CRLs will move back up following the push shaft of the motor since the push shaft moves down to the limit position, so that the CRLs are switched into the state of OFF-axis;
3) the CRLs performs 1 time of switch on its state for each cycle of the push shaft of the motor moves down to the limit position and returns once again; furthermore, by the transform position between high and low of the slider with ratchet guide slot, and by the corresponding position locking, and also by the action of the preload spring on the CRLs holder, it can achieve the state self-locking or state keeping of the switched CRLs.

A collimating alignment method based on an X-ray transfocator system, is characterised that, the push shaft of the motor pushes down to the push rod of the target switched arm to make the slider with ratchet guide slot of the push-push ratchet mechanism a downward motion from high to low position, resulting in the compression of the preload spring which brings out a force directly on the two-dimensional flexible axis and the CRLs holder, eventually, so that cylindrical profile of CRLs in the holders is tangent to and coincide to V-groove, named center alignment.

The novel X-ray transfocator system of the invention adopts the horizontal and vertical orthogonal layout driving scheme. The vertical linear driving component is placed on the horizontal step motor and linear positioning table to be sent the target position by the horizontal positioning table for state switch (ON-axis or OFF-axis) of the switched arm (CRLs). It can achieve the state self-locking or state keeping of the switched CRLs, so as to flexibly realize the arrangement and combination of different CRLs on the optical axis, namely the new CRLs, to further establish the design method of a novel X-ray focus variation system also namely transfocator.

The orthogonal layout driving scheme is that only two pieces of motor are used for the drive of the state switch (ON-axis or OFF-axis) of N stacks of the CRLs of the switched arms, to acquire various arrangement and combinations of CRLs namely focus variation realization.

The invention provides a design method and structure of CRLs switched arms with state self-locking and state keeping function. It successively consists of a push-push ratchet self-locking mechanism and bottom rod, a preload spring and guide stick, a two-dimensional flexible axis, a CRLs holder and so on. The guide stick, the bottom rod and preload spring constitute a telescopic sleeve structure which is located in the preload spring. For the structure, the upper end is connected with the bottom of the slider with ratchet guide slot, and the bottom of the structure is connected with the two-dimensional flexible axis.

The invention provides a design method and structure of the misalignment compensation of CRLs based on a two-dimensional (2D) flexible axis. The two-dimensional (2D) flexible axis is connected with the CRLs holder mounted the CRLs. If the CRLs switched arm motion axis misaligns with the center of the bottom positioning V-groove, CRLs is under the action of preload spring force and two-dimensional angle compensations of 2D flexible axis to ensure that cylindrical profile of CRLs in the holders is tangent to and coincide to V-groove when the switched arm moves downward. Finally, each switched arm also namely each stack of CRLs is aligned in center.

The invention provides a push-push ratchet self-locking mechanism structure, consists of an extension spring, a slider with ratchet guide slot, a guide baseplate, a C-shaped tie rod, an elastic knot (e.g. using disc springs), etc. The slider with ratchet guide slot means having ratchet guide slot for the self-locking on the slider. The slider and guide baseplate constitutes a linear guide slider motion pair by a linear slide groove and a guide structure, meanwhile, the upper end of the slider with ratchet guide slot is connected with the upper end of the guide baseplate by the extension spring, to make the slider with ratchet has always maintained an upward movement trend. The slider with ratchet guide slot is connected with the bottom of the guide baseplate by the C-shaped tie rod. And the upper end of the C-shaped tie rod contacts with the inner side and bottom face of the ratchet guide slot of the slider (namely the upper end of C-shaped tie rod moves in the ratchet guide slot of the slider). The lower end of the C-shaped tie rod is connected to the guide baseplate by elastic clamping (e.g. using disc springs) to ensure that the C-shaped tie rod can swing and slightly change the pitch angle. Therefore, in this way, the upper end of the C-shaped tie rod can carry out a predetermined trajectory in the ratchet guide slot for unidirectional sliding motion and has an inverted hook effect, so that the slider with ratchet guide slot moves up and down in two characteristic positions (high and low) and can be switched and self-locked.

The advantages of the invention are as follows:

The existing traditional scheme uses N pieces of motor components and N pieces of flange vacuum motion feeds to switch the N arms. Due to the size limitation of the motors and the flanges themselves, each arm is large and the distance between the two arms should not be too small. Therefore, it not only has cumbersome and not compact mechanism and high cost, but also occupies large space, which affects the working distance of the entire focusing device (distance from contour behind edge to the focusing point). Finally, its performance is greatly limited, and it is difficult to meet the technical requirements of advanced beamline design and layout optimization.

In order to overcome the above problems, the main highlight of the invention is to propose an orthogonal motor drive scheme based on horizontal and vertical directions, namely, using only two motors and orthogonal layout, and to design a compact switched arm mechanism with self-collimation, self-locking and position switching functions, so as to form a new design method and device of TRANSFOCATOR. Its simple structure, compact size, low cost and small size make it not only have a larger working distance or can achieve a larger zoom function, which provides a technical basis for high performance/advanced beamline design and optimization.

DETAILED DESCRIPTION OF THE EMBODIMENTS

The invention is further described in detail in the annex below, and the examples are used only to explain the invention, not to limit the scope of the invention.

Figure 1:
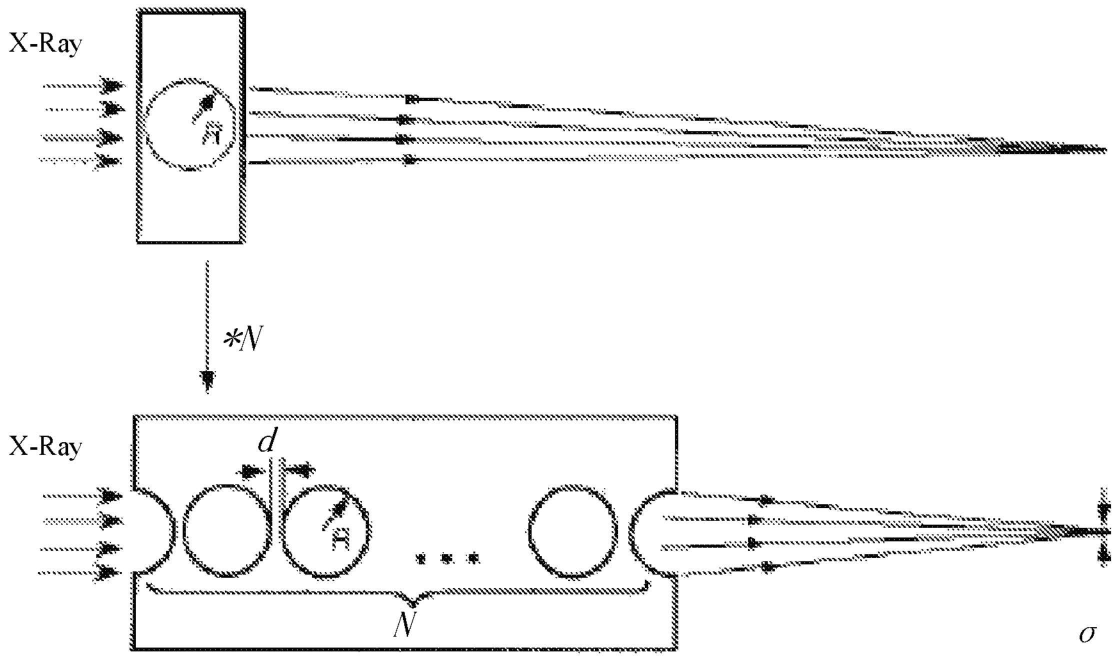
Prior Art Fig. 1
FIG. 1 is the schematic diagram of focusing principle and structure of CRLs on X-ray.
Figure 2:
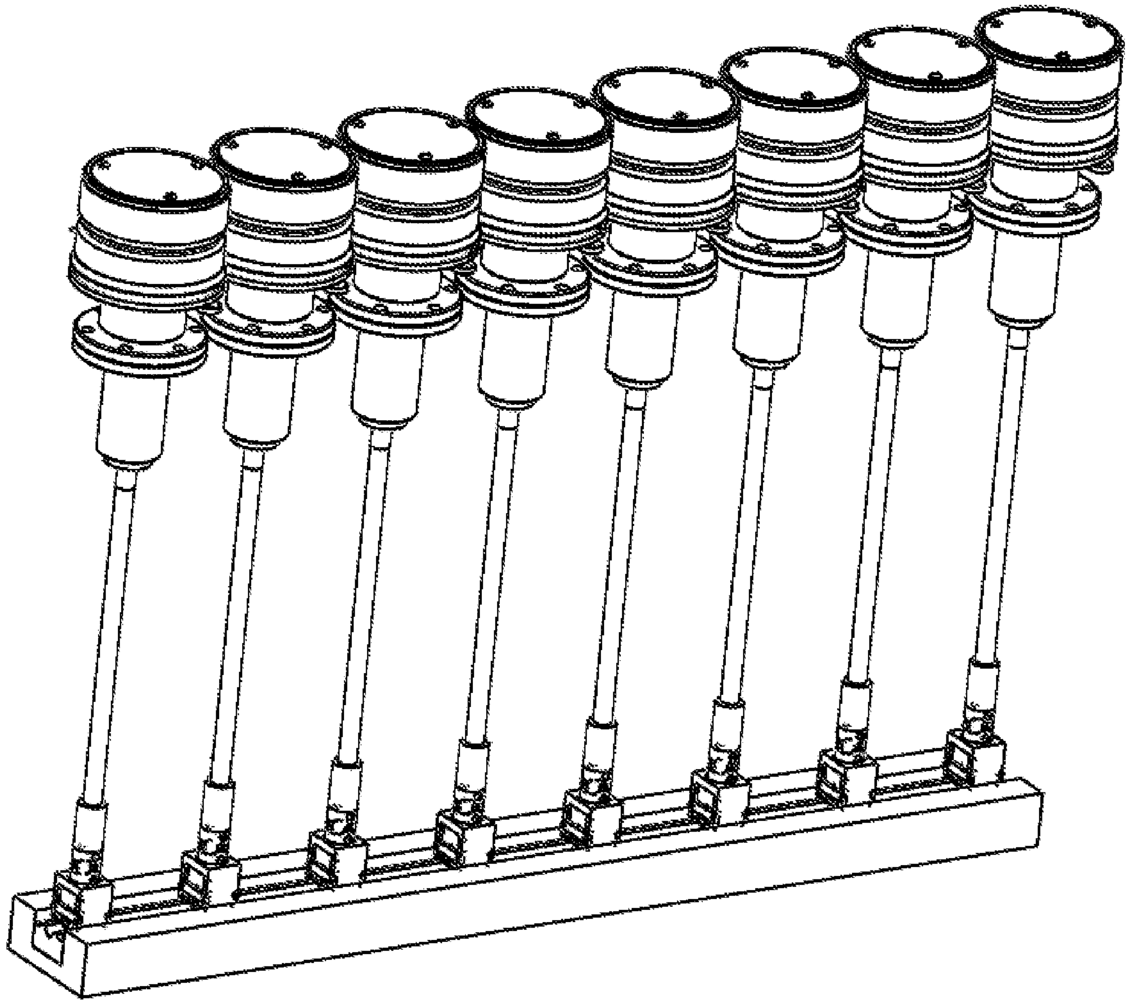
Prior Art Fig. 2
FIG. 2 is a typical Transfocator design scheme.
Figure 3:
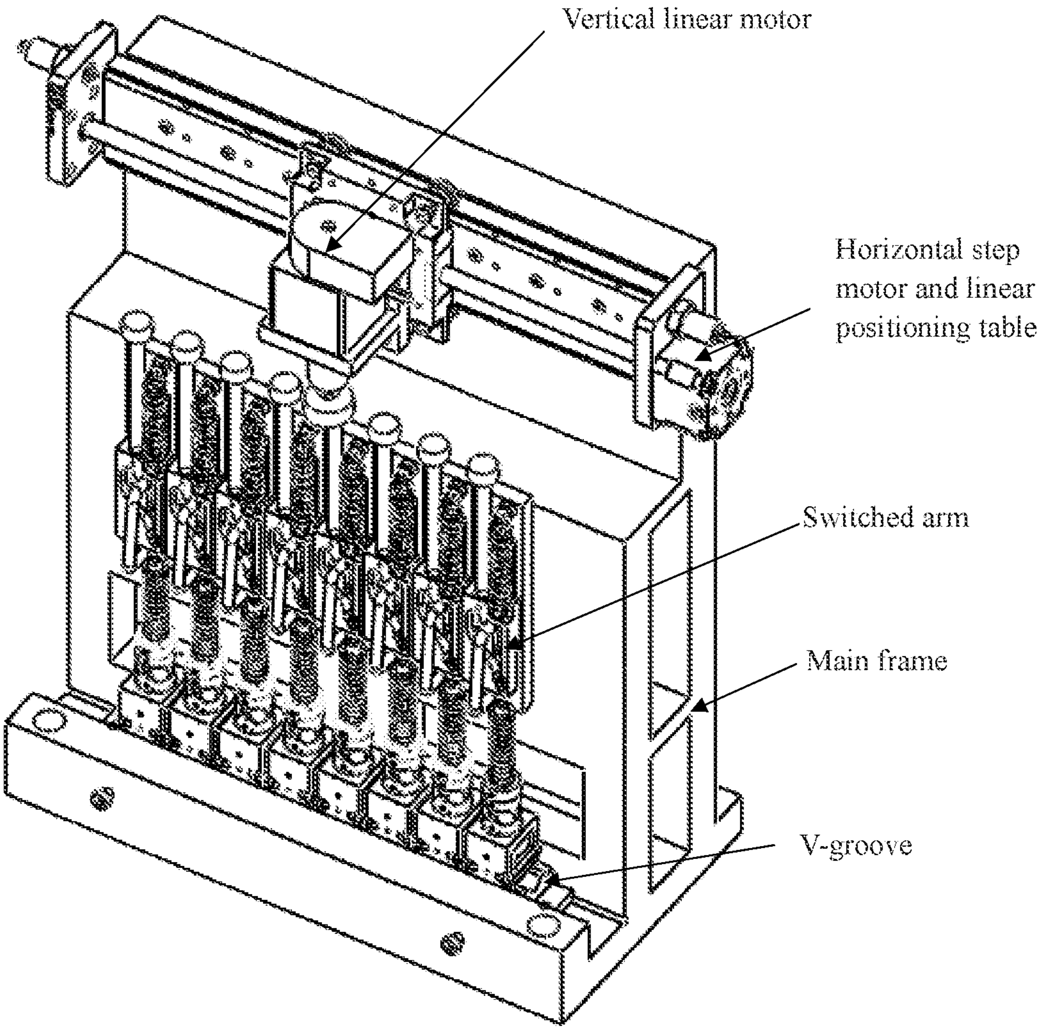
FIG. 3 is the overall scheme structure of the invention.

The system of the invention is shown in FIG. 3, two motor drive components with orthogonal layout are set directly above the switched arms, which are composed of a (vacuum) horizontal step motor and its linear positioning table and a vertical linear motor. And the vertical linear motor installed on the positioning table can perform horizontal motion with the positioning table. A switched arm to be switched is set under the push shaft of the vertical linear motor (there is a certain height difference). N same arms are in turn compactly arranged along the optical axis direction (Supposed it is horizontal, and parallel to the direction of the horizontal positioning table). A long V-groove is arranged just below the N same arms. Supposed the common line of the two inner inclined planes of the V-groove is parallel to the optical axis, and make the opening of the V-groove face upward. The orthogonal drive component, the N arms to be switched, the V-groove, etc. are all installed on a same main frame. The overall structure and scheme are shown in FIG. 3.

Figure 4:
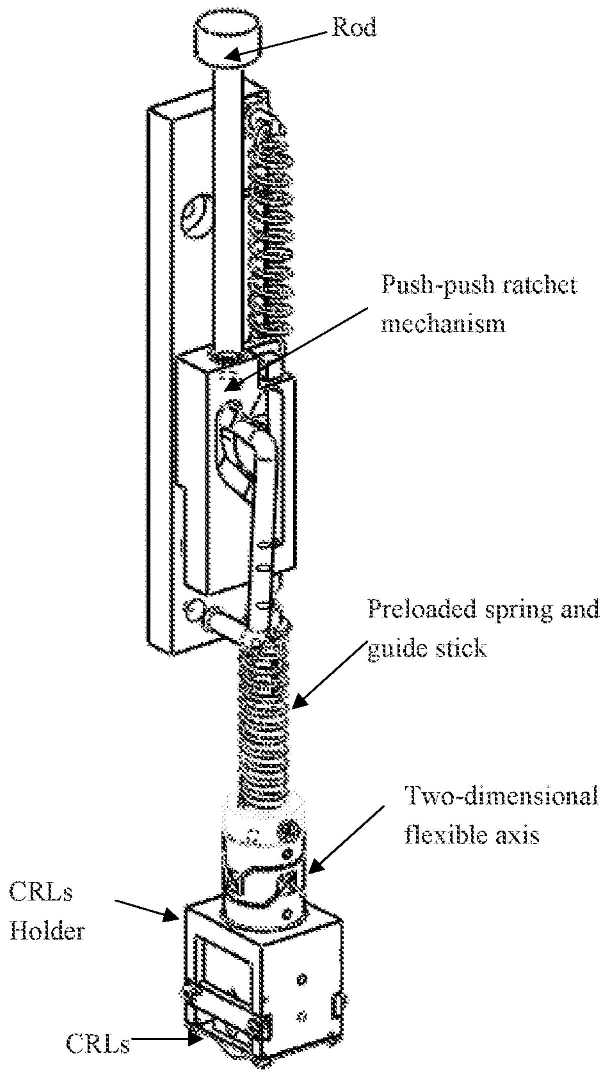
FIG. 4 is the structure diagram of a switched arm with push-push self-locking function.

The mentioned above switched arm to be switched are successively composed of a push rod, a push-push ratchet mechanism, a preload spring and a guide stick, two-dimensional flexible axis, and a CRLs holder and CRLs from top to bottom, as shown in FIG. 4. The upper of the push rod is connected with the switched arm, and its bottom is connected with the push-push ratchet mechanism. The bottom of the push-push ratchet mechanism is connected with the CRLs holders by the preload spring and a guide stick, two-dimensional flexible axis.

Figure 5:
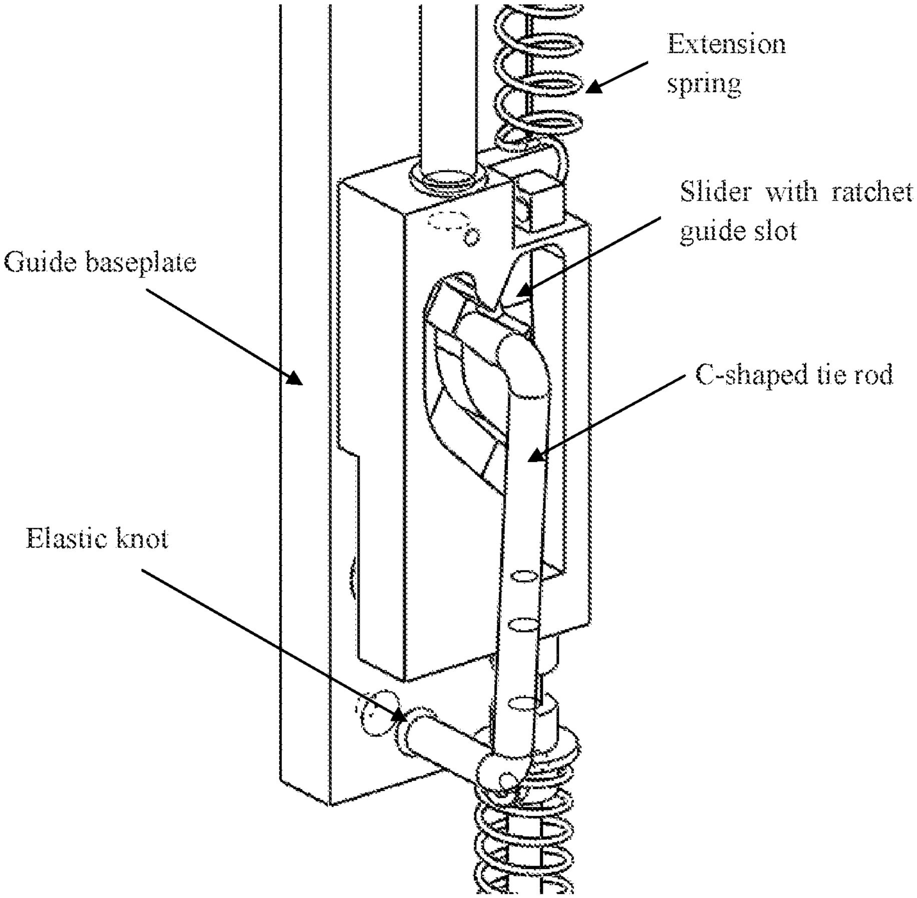
FIG. 5 is the diagram of a push-push ratchet mechanism.

The mentioned above push-push ratchet mechanism is composed of an extension spring, a slider with ratchet guide slot, a guide baseplate, a C-shaped tie rod, an elastic knot (e.g. using disc springs), etc., as shown in FIG. 5. The slider and guide baseplate constitutes a linear guide slider motion pair by a linear slide groove and a guide structure, meanwhile, the upper end of the slider with ratchet guide slot is connected with the upper end of the guide baseplate by the extension spring, to make the slider with ratchet has always maintained an upward movement trend. The upper end of the C-shaped tie rod contacts with the inner side and bottom face of the ratchet guide slot of the slider. And the lower end of the C-shaped tie rod is fixed to the guide baseplate by elastic clamping (e.g. using disc springs) to ensure that the C-shaped tie rod can swing and slightly change the pitch angle. Therefore, in this way, the upper end of the C-shaped tie rod can carry out an unidirectional sliding motion with a predetermined trajectory in the ratchet guide slot, as shown in FIG. 5.

Figure 6:
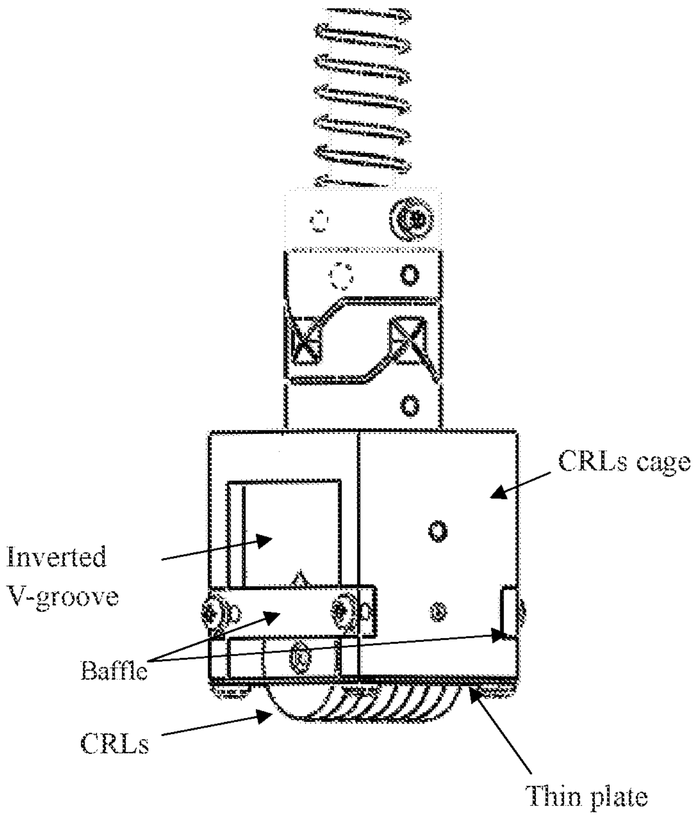
FIG. 6 is the assembly structure of the CRLs holder and CRLs

The assembly structure of the mentioned above CRLs holder and CRLs, is mainly composed of a CRLs cage, an inverted V-groove, two baffles, a thin plate, CRLs, etc., as shown in FIG. 6.

2 Working Principle and Process:

1) When a CRLs holder and CRLs need to be switched ON/OFF relatively the optical axis, the horizontal step motor and its linear positioning table of the orthogonal motor drive components will move horizontally to change the position of the vertical linear motor along the optical axis, to make the push shaft of the vertical linear motor alignment with the arm and its push rod that need to be switched ON/OFF relatively the optical axis. In other words, that is, the vertical linear motor is sent to the target position by the horizontal step motor and its linear positioning table, and the target position is just above the corresponding arm of the CRLs to be switched relatively the optical axis. If the current arm and CRLs are the state of OFF-axis, the switch function is performed to push CRLs into the optical axis, called switch ON. On the contrary, the ON-axis CRLs is moved outside the optical axis, which is called switch OFF.

2) When the vertical motor arrives at the target position, it performs a vertical downward motion namely pushing down. If the current CRLs is the state of OFF-axis, the pushdown process can be divided into three stages: In the first stage, the push shaft of the motor moves downward until it contacts the push rod of the arm to be switched, that is, a clearance elimination process from disconnection to contact between the shaft of the vertical linear motor and the push rod of the target switched arm. In the second stage, the motor continues to push down the push rod to make the arm to be switched a downward motion so that the CRLs reach the V-groove at the bottom, and to make the cylindrical contour of the CRLs is tangent to the two inner inclined planes of the V-groove. The process is the CRLs switch into the optical axis, which is a switch ON stage. In the third stage, the motor still continues to push down, and the action of the push rod makes the slider with ratchet guide slot of the push-push ratchet mechanism in the arm to be switched further down to the limit position. It continues to move from the CRLs in place and pretension state to the limit position, which is called an over travel stage.

3) When the mentioned above slider with ratchet guide slot reaches the limit position, the vertical linear motor will perform the reverse movement, that is, lift up, until its push shaft is disconnected from the push rod of the arm that needs to be switched, and a little distance is maintained, that is, the push shaft of the vertical linear motor returns to the initial position (vertical direction).

4) During the process of the mentioned above 2) pushing down, the cylindrical profile of CRLs is fully tangent to and coincide to two inner inclined planes of the V-groove, which is called the state of switch ON of CRLs relatively to the optical axis, namely the CRLs inserted into the optical axis. The CRLs position of the state will be kept and ON state self-locking during the mentioned above 3) process of the lift up.

5) The mentioned above 4) the ON state self-locking of the CRLs is completed by the cooperation of the push-push ratchet mechanism, the preload spring and guide stick, the two-dimensional flexible axis of the arm to be switched. During the mentioned above the process of 2) pushing down and 3) lift up, the slider with ratchet guide slot in the push-push ratchet mechanism changes from high position to low position, and can self-lock under both states of the high and low positions. When the slider with ratchet guide slot is under the low position, the mentioned above slider with ratchet guide slot applies a force to the two-dimensional flexible axis and the CRLs holder & CRLs by the preload spring and guide stick, to ensure the CRLs position of the mentioned above 3) process is still kept and achieve the ON state self-locking. The mentioned above 2D flexible axis allows two-dimensional angle slight adjustment of the central axis of the CRLs cylinder to ensure alignment with the center of the V-groove.

6) The mentioned above 5) push-push ratchet mechanism can change high position to low position, which is pushed downward to overcome the forces sum of the tension of the extension spring between the slider with ratchet guide slot and the guide baseplate, the pressure of the preload spring between the slider with ratchet guide slot and the CRLs holder. It moves from high position to low position along the vertical guide. Meanwhile, this makes the upper end of the C-shaped tie rod move relative to the slider with ratchet guide slot, that is, its upper end unidirectionally slides from bottom to top in the ratchet guide slot of the slider with ratchet guide slot. Since the lower end of the C-shaped tie rod is fixed on the guide baseplate (the height is fixed), when the slider with ratchet guide slot changes from high position to low position, the upper end of the C-shaped tie rod immediately reverses the slider with ratchet guide slot after sliding of the upper end of the C-shaped tie rod from down to top along the ratchet guide slot, that is, the slider with ratchet guide slot realizes the transformation from high position to low position. Due to the unidirectional sliding feature of the ratchet guide slot, the C-shaped tie rod reverses and locks the current low position.

7) The mentioned above 6) push-push ratchet mechanism with self-locking is based on ratchet mechanism, performs the relative motion of unidirectional and predetermined trajectory, so as to realize the C-shaped tie rod to reverse hook and self-lock the two positions (high and low position states) of the up and down movements under the action of the vertical linear motor.

8) In the mentioned above 2), if current arm and CRLs is the state of ON-axis, the switch off will be implemented, and its pushdown process is changed from the three stages in 2) to two stages. They are the first stage of a clearance elimination and the third stage of an over travel. Since CRLs are already ON-axis state, the second stage of a switch ON is not included in the pushdown process. But, there is an additional stage in the lifting process in the mentioned above 3), namely CRLs switching OFF, that is, the slider with ratchet guide slot in the push-push ratchet mechanism will change from low position to high position so that the CRLs will move up with the slider with ratchet guide slot under the action of the extension spring until the CRLs are completely moved out of the optical axis, and this state is self-locking by the push-push ratchet mechanism in the high position, so that the CRLs (OFF-axis) state can be maintained, i.e. self-locking (OFF-axis) state. Then, the vertical linear motor continues to move up until it is disconnected from the push rod of the switched arm and maintains a certain distance, that is, the push shaft of the vertical linear motor returns to the initial position (vertical direction).

9) When it is necessary to operate the switch-ON and switch-OFF of other arms, different arms and different target positions can be selected by adjusting the positions of the horizontal step motor and linear positioning table. Repeat steps 2)~8) to realize the state switching (ON- or OFF-axis) and state self-locking of any arm and CRLs. Finally, the arrangement and combination of CRLs of different specifications along the optical axis direction can be realized, so as to achieve the purpose of changing the focal length of the lens system, i.e. zoom/transfocator.

Figure 7:
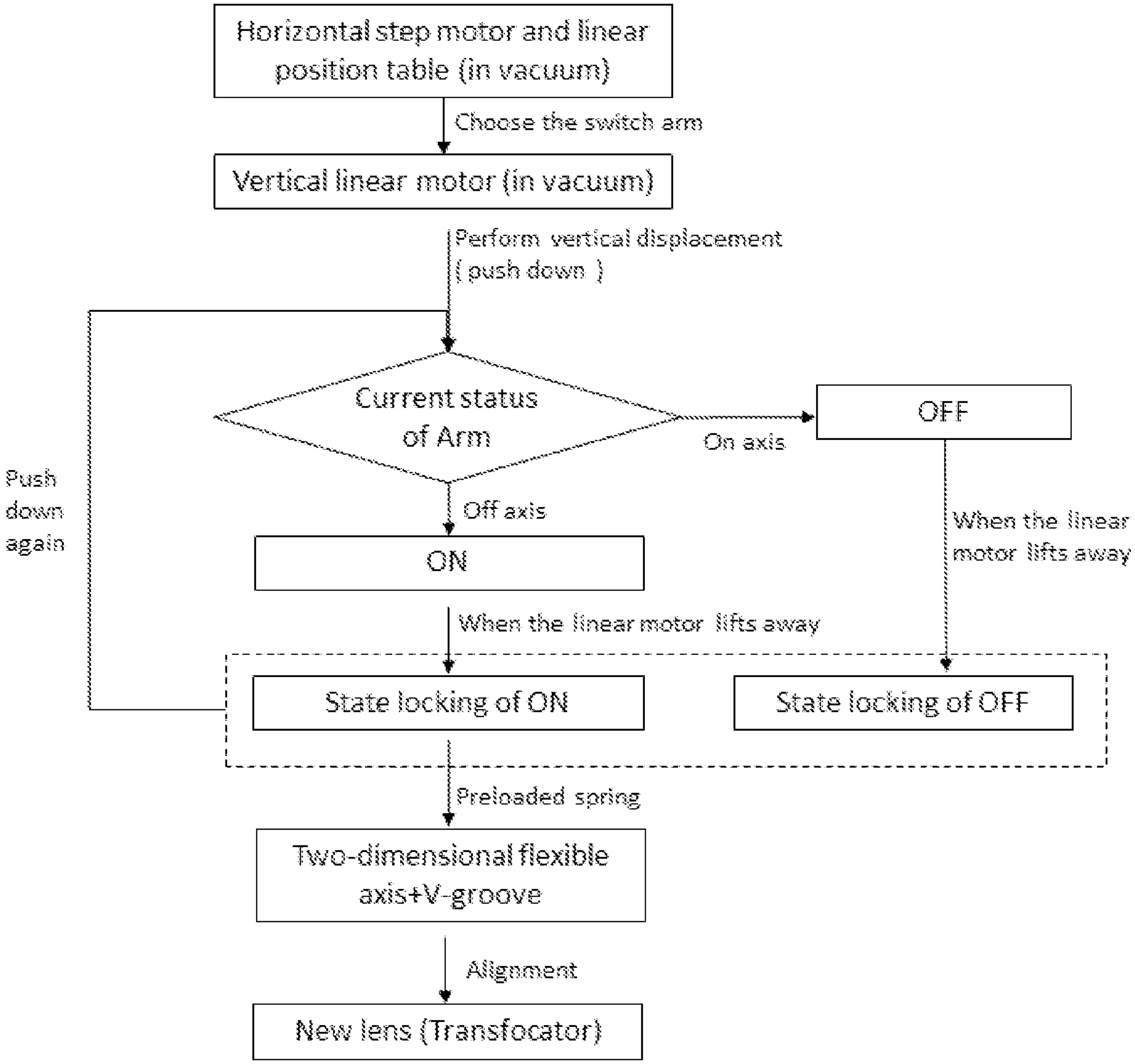
FIG. 7 is the workflow chart of the invention.

The technical scheme and workflow chart of the invention are shown in FIG. 7.

First, the vacuum horizontal step motor and linear positioning table move to send the vertical linear motor to the position of the target switched arm;

Second, the push shaft of the vacuum vertical linear motor first moves downward (pushes down), and then returns to the upward motion (lifts up) after reaching the limit position;

Third, the CRLs will be pushed into the optical axis by the action of push downward of the push shaft of the vertical linear motor if the CRLs is OFF-axis state. The state will not change with the withdrawal and lifting of the push shaft of the vertical linear motor, that is, the CRLs (ON-axis) state locking (self-locking) will be realized. And the CRLs will return to upward movement (lifting) after the push shaft of the vertical linear motor pushes down to the limit position if the CRLs is ON-axis, namely, the arm and CRLs follow the push shaft of the vertical linear motor to return and lift to make the CRLs outside of the optical axis. At this time, the CRLs are in (OFF-axis) state and are maintained and locked (self-locking).

Fourth, as known as in 3rd item, whenever the vertical linear motor completes one cycle of a whole movement process of "moving down-limit position-lifting up", the corresponding arm will occur one time of state change/switch. And the state can be kept and self-locked after the state change/switch. After the CRLs switched into the optical axis, the CRLs cylindrical contour and center line are aligned with the center of the V-groove under the combined action of the preload of the preload spring and the compensation of the 2D flexible axis.

Fifth, the state switch of ON-/OFF-axis and self-locking of arms and CRLs stacks arranged compactly along the optical axis can be achieved by repeating above steps. Then, many new combinations of the CRLs are formed in the optical axis for changing the focal length of the lens system, also namely the achievement of zoom (transfocator).

In the layout scheme of the orthogonal motor drive components, a horizontal motor in vacuum and a vertical linear motor in vacuum are used. This is only one of typical application or an example application. They can also be various motors or drivers or displacement actuators in ambient environment; Further, the horizontal and vertical directions are only one of example. They can be any two orthogonal directions, but one of them must be parallel to the optical axis.

Although specific embodiments of the invention have been disclosed for illustrative purposes, and the purpose is to help understand the contents of the invention and implement it, those skilled in the art can understand that various substitutions, changes and modifications are possible without departing from the spirit and scope of the invention and the appended claims. Therefore, the invention should not be limited to the content disclosed in the best embodiment, and the scope of protection claimed in the invention shall be subject to the scope defined in the claims.

The invention claimed is:

1. An X-ray transfocator, comprising:

a main frame, a plurality of switched arms arranged on one side of the main frame and along the optical axis of the X-ray transfocator, a driving component set at the top of the main frame, and a positioning groove set at the bottom of the main frame;

wherein each of said switched arms is composed of successively connected a push rod, a push-push ratchet mechanism, a preload spring and a guide stick, a two-dimensional flexible axis, and a CRLs holder from top to bottom; the said guide stick is a telescopic structure, which is located in the said preload spring; CRLs are stacked and arranged in the said CRLs holder; the said push-push ratchet mechanism contains an extension spring, a slider with a ratchet guide slot, a guide baseplate, a C-shaped tie rod, in which the slider with ratchet guide slot and the guide baseplate form a linear guide motion pair by a linear groove and a guide structure; the upper end of the slider with the ratchet guide slot is connected to the upper end of the guide baseplate by the extension spring; the lower end of the slider with ratchet guide slot is successively connected with the preload spring and guide stick, the two-dimensional flexible axis, and the CRLs holder; an upper end of the C-shaped tie rod slidingly mated in the ratchet guide slot of the slider with ratchet guide slot, and its lower end is connected with the bottom end of the guide baseplate by an elastic clamping;

said positioning groove is located directly below the switched arms, and its opening is upward, its axis is parallel to the optical axis;

said driving component includes a positioning table and a motor located on the positioning table; said positioning table is used to move the motor above the arm to be switched; said motor is used to thrust the push rod of the arm to be switched, to control the sliding of the upper end of the corresponding C-shaped tie rod in the ratchet guide slot of the slider with the ratchet guide slot, so that the slider with the ratchet guide slot is in low or high state, to make the switched arm to be ON-axis or OFF-axis relative to the optical axis.

2. The transfocator according to claim 1, wherein said positioning groove is a V-groove formed by two inclined planes; and the common line of the two inclined planes of the V-groove is parallel to the optical axis.

3. The transfocator according to claim 2, wherein, if the corresponding CRLs is in the state of OFF-axis when said motor arrives at the switched arm, the process to push down is divided into three stages: in the first stage, a push shaft of the motor moves downward until it contacts the push rod of the switched arm; in the second stage, the motor continues to push down the push rod to make the switched arm a downward motion so that the CRLs reach the V-groove at the bottom of the main frame, and to make the cylindrical contour of the CRLs is tangent to the inner surfaces of the two inclined planes of the V-groove; in the third stage, the motor still continues to push down, and the action of the push rod makes the slider with ratchet guide slot of the push-push ratchet mechanism in the switched arm further down to a limit position, then the motor carries out lifting until the push shaft is disconnected from the push rod.

4. An collimating alignment method based on the X-ray transfocator of claim 2, wherein when the CRLs are switched into the optical axis, a push shaft of the motor pushes down to the push rod of a target switched arm to make the slider with ratchet guide slot of the push-push ratchet mechanism a downward motion from high to low position, resulting in the compression of the preload spring which brings out a force directly on the two-dimensional flexible axis and the CRLs holder, eventually, so that cylindrical profile of CRLs in the holders is tangent to and coincide to the V-groove, named center alignment.

5. The transfocator according to claim 1, wherein said ratchet guide slot in the slider with ratchet guide slot is a Y-shaped ratchet slot whose upper notch and bottom slot are correspond to a low position state and a high position state respectively.

6. The transfocator according to claim 1, wherein said slider with ratchet guide slot is pushed downward to overcome the forces sum of the tension of the extension spring and pressure of the preload spring when the slider with ratchet guide slot moves downward with the push rod, so that the upper end of said C-shaped tie rod unidirectionally slides from bottom to top in mentioned ratchet guide slot; when the slider with ratchet guide slot has moved from high position to low position, the upper end of the C-shaped tie rod moved from bottom to top along the ratchet guide slot and hooks the slider with ratchet guide slot, that is, the slider with ratchet guide slot realizes the transformation from high position state to low position state.

7. An X-ray focus variation method based on the X-ray transfocator of claim 1, including the following steps:

1) the positioning table will send the motor to the position of a target switched arm;
2) a push shaft of the motor firstly moves downward to push the push rod of the switched arm, to make that the slider with ratchet guide slot of the target switched arm move down to a limit position and return to an upward movement; if the CRLs of the target switched arm is in the state of OFF-axis, it is pushed into the optical axis under the action of the push shaft of the motor, which is called switch ON of the CRLs; if the CRLs of the target switched arm is in the state of ON-axis, it will follows the push shaft of the motor and returns to lift up, to make the CRLs switch OFF relatively to the optical axis after that the slider with ratchet guide slot of the target switched arm move down to the limit position and return to the upward movement;
3) whenever the motor completes one cycle of a whole movement process of "moving down-limit position-lifting up", the CRLs have been 1 time of the transform of switch ON/OFF or state change; furthermore, by the position of the transform between high and low of the slider with ratchet guide slot, and by a corresponding position locking, and also by the action of the preload spring on the CRLs holder, it can achieve state keeping or state self-locking of the switched CRLs after switching.

* * * * *